No. 712,106. Patented Oct. 28, 1902.
E. THOMSON.
ELECTRIC METER.
(Application filed Oct. 13, 1898.)
(No Model.)
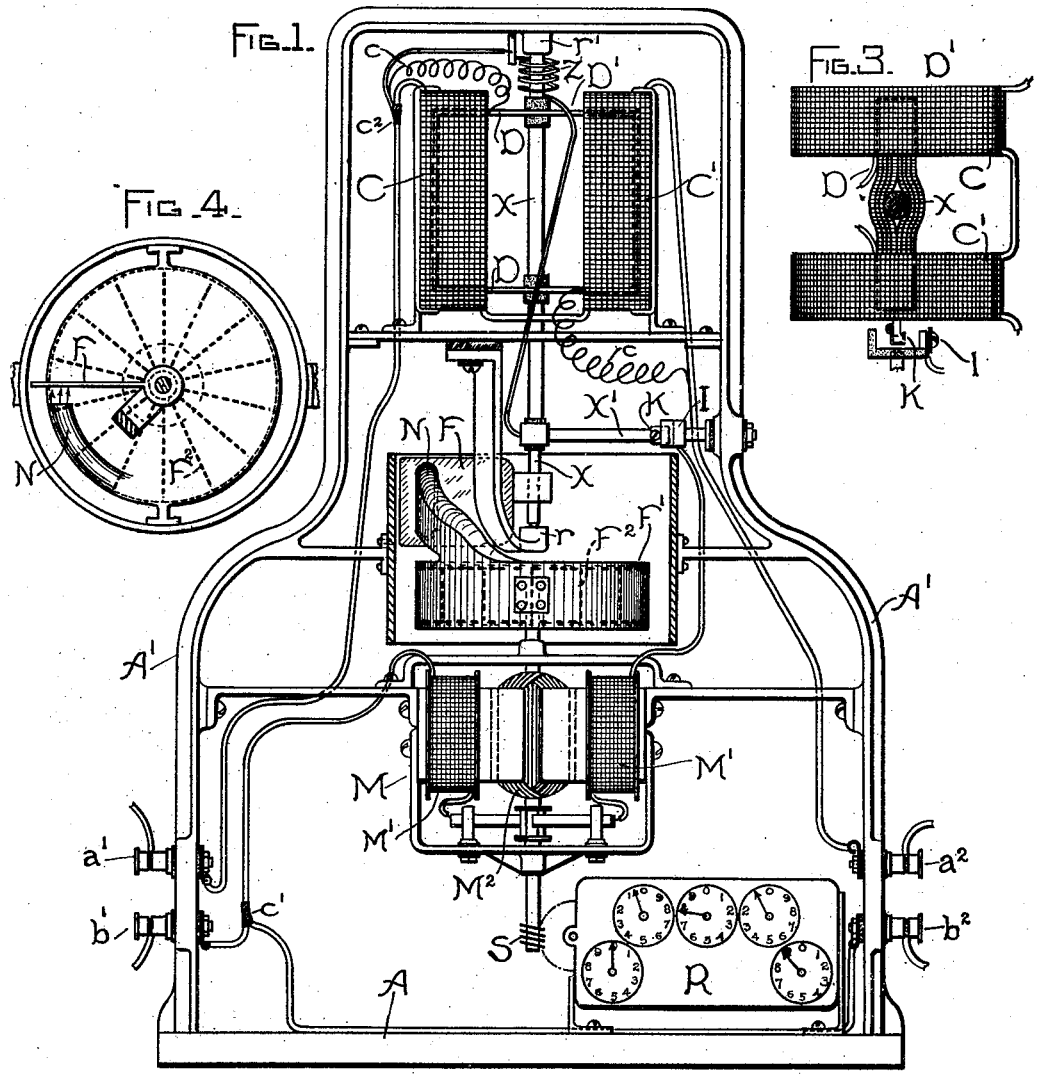
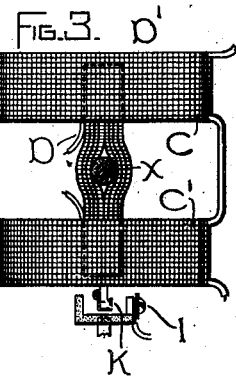
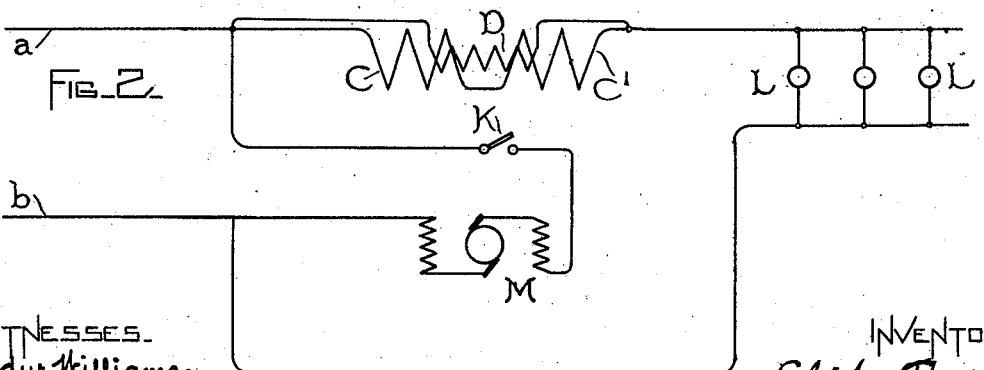
WITNESSES
Edw. Williams
B. B. Hull
INVENTOR
Elihu Thomson
by Albert B. Davis
Atty.

UNITED STATES PATENT OFFICE.

ELIHU THOMSON, OF SWAMPSCOTT, MASSACHUSETTS, ASSIGNOR TO THE GENERAL ELECTRIC COMPANY, A CORPORATION OF NEW YORK.

ELECTRIC METER.

SPECIFICATION forming part of Letters Patent No. 712,106, dated October 28, 1902.

Application filed October 13, 1898. Serial No. 693,392. (No model.)

*To all whom it may concern:*

Be it known that I, ELIHU THOMSON, a citizen of the United States, residing at Swampscott, in the county of Essex and State of Massachusetts, have invented certain new and useful Improvements in Electric Meters, (Case No. 756,) of which the following is a specification.

The meter which forms the subject of the present application is designed more especially as an ampere-hour or coulomb meter and belongs to that type in which the speed of the motor element is controlled by a separate device responsive to changes in the energy to be measured. So far as the present invention is concerned, the motor element of the meter may be of any conveniently-controlled form, either mechanical, electrical, or otherwise. I prefer to employ, however, an electric motor, because of its ease of speed control, and the particular form of speed control which I find more convenient is that in which the circuit of the motor is intermittently opened and closed, though any other means for controlling the speed of the motor may be employed, if desired and suitable.

The motor may of course receive its energy from any convenient source, though preferably from the circuit the current of which is to be measured. The motor-controlling device which I find it preferable to employ is in the form of an electrodynamometer of any suitable type, relative motion between the members of which is caused to close and open the circuit of the motor. A vane attached to the movable member of the dynamometer is arranged to be acted upon by air-pressure derived from a fan driven by the motor element of the meter. The torque due to current in the dynamometer is arranged to close the circuit of the motor. The pressure on the vane above referred to is in such a direction as to tend to open the circuit of the motor. When current flows through the dynamometer, the circuit of the motor will be closed and the motor will start up and run till its speed is sufficient to cause the air-pressure due to the fan driven thereby to open its circuit, whereupon its speed falls and the circuit is closed by the dynamometer. This action takes place intermittently so long as the current in the dynamometer remains the same. When the current changes, the speed of the motor changes accordingly. As is well known, the torque exerted between the members of the dynamometer is proportional to the square of the current passing therethrough, while the pressure of air due to motion of the fan is proportional to the square of the speed of the fan. When these two quadratic functions are caused to maintain an approximate balance, as in the manner described, it will be evident that the speed of the motor which drives the fan is proportional to the current which passes through the dynamometer.

The accompanying drawings illustrate a meter embodying my invention. Of course many forms might be chosen, and I have therefore selected a particular apparatus for illustration, as any apparatus embracing the principles just outlined would be within my invention.

Figure 1 is a front elevation, partly in section, of the operative parts of a meter in which the invention is used. Fig. 2 is a diagram of the circuits. Fig. 3 is a plan of the dynamometer-coils, showing the contacts connected to the moving coil; and Fig. 4 is a plan of the air-blast arrangement.

In Fig. 1, A is the base of the instrument, supporting the frame A', which carries the working parts. M is the motor consisting of the field-magnets M' and the armature $M^2$. It is, as represented, a series motor and is designed to be of high resistance, so that it will take but small current. R is the counter of the usual form in electric meters, the wheel of which is geared to the motor-shaft by a worm S. Upon the upper end of the shaft is an air-blast apparatus consisting of a fan $F^2$, blowing air through a chute N against the vane F, the latter being attached to the shaft X of the dynamometer D'. The shaft is mounted for rotation in suitable bearings $r\ r'$, the arrangement being such that the friction is small as possible.

The dynamometer consists of coils C C' in series with the load. These coils are of any desired shape or size and are hollow, so that another movable coil D, carried by the shaft X, may rotate between or within them. This coil is connected in shunt to the coils C C', but is also in series with the load, this arrangement, as will be understood, giving a torque in the coil D varying according to the square of the current. A spring Z gives a very slight rotative tendency to the coil D just sufficient to keep the contact K open when no current is flowing. An arm X' is affixed to the shaft X and carries this contact, which coöperates with another or fixed contact I. These parts will be better understood by reference to Fig. 3, in which the same reference-letters are used. Fig. 4 also illustrates the fan arrangement, as already briefly described, provided with a proper inclosing box. Any suitable fan may be used.

The design of the motor should be so chosen that the motor does not tend to limit its own speed within the working range of the meter. For this reason a series motor may conveniently be employed, though not of necessity. The same type of motor may be used where alternating currents are to be measured, if desired, although other types of alternating-current motor may be employed, provided they do not tend, as already explained, to limit their speed within the capacity of the meter.

In Fig. 2 the circuits of the apparatus are shown. In this figure $a\ b$ are the mains of a constant-potential circuit or branches from the mains, between which are connected the lamps L L or other load to be measured. C C' show the coils of the dynamometer, which carry the current to be measured or a current proportional thereto, and D is the movable coil in shunt to the coils C C', but in series with the load. By making the movable coil a shunt to the fixed coil rather than in series therewith it is possible to construct the movable coil of fine wire with small current-carrying capacity, and thus light and delicate, as is desirable in the moving element of a measuring instrument. K is the contact, operated by the fan, and M is the motor. The connections may also be traced in Fig. 1, where the current enters at the binding-post $a'$, thence passing to the series coils C C' and out at $a^2$. The negative main passes through the meter from binding-post $b'$ to $b^2$. The dynamometer-coil D is shown connected by the flexible connections $c\ c$, which should be of such nature that they afford practically no resistance to the movement of the coil, as is well understood in the construction of such instruments. The circuit of the motor starts from point $c^2$ on the positive side of the circuit, passes to the contact K, thence to contact I through the motor, and out to the negative main at the point $c'$.

Assume that none of the lights L L are burning. Then no current will pass in the coils and practically none through the motor, which will remain at rest. If now the lights be turned on, the flow of current in the coils D C C' causes the coil D to be deflected and close the contacts K I, with torque proportioned to the square of the current flowing. The motor then begins to run and to increase in speed, thus turning the fan F² faster. The air-pressure against the vane F increases until the force exerted is sufficient to just open the contacts K I, thus throwing the motor out of action. As soon as its speed falls to such an extent that the contact K can again close under the influence of the current in the coils of the dynamometer the motor is again connected in circuit and again begins to speed up. This action continues indefinitely, the revolutions of the motor being recorded by the counter R. It is evident that the vane instead of being acted upon by a jet of air might equally as well be operated simply by air-pressure due to the fan. As already explained, a substantial proportionality between the speed of the motor and the amount of current-flow is obtained by the balance of the actions described.

What I claim as new, and desire to secure by Letters Patent of the United States, is—

1. The combination in a meter, of a motor arranged to run at different speeds during normal operation, a fan, a circuit for the motor, an electrical device for closing the circuit, and a device actuated by the fan for opening the circuit when the speed of the motor exceeds proportionality to the current flowing.

2. The combination in a motor-meter, of a fan, a motor for actuating the fan, a contact for controlling the circuit of the motor, means tending to close the contact with a force proportional to the square of the current flowing, and a vane actuated by the pressure of air from the fan for opening the contact.

3. In a motor-meter, the combination of a motor connected across the mains, a contact for opening and closing the circuit of the motor, an electrodynamometer tending to close the contact, and a fan driven by the motor and tending to open it.

4. In an electric meter, the combination of a motor, means controlled by the current to be measured for increasing the speed of the motor, and pneumatic means controlled by the motor for decreasing the speed of the motor.

5. In an electric meter, the combination of a motor arranged to run at different speeds during normal operation, means for supplying energy to the motor, and means actuated by fluid-pressure for shutting off the supply of energy to the motor when its speed reaches proportionality with the energy to be measured.

6. In an electric meter, the combination of an electric motor arranged to run at different speeds during normal operation, a circuit-closing device therefor actuated by current passing through the meter, and means, actuated by fluid-pressure of a value which varies with the amount of current passing through the meter for opening the circuit of the motor.

7. In an electric meter, the combination of an electric motor arranged to run at different speeds during normal operation, a circuit-closing device therefor actuated by current passing through the meter, and means operated by fluid-pressure for opening the circuit of the motor when the speed of the motor becomes proportional to the energy to be measured.

8. In an electric meter, the combination of an electric motor, a circuit-closing device therefor, and means for exerting upon said circuit-closing device the resultant of two opposing forces, one of which is a function of the energy to be measured, and the other proportional to the square of the speed of the motor.

9. In an electric meter, the combination of an electric motor, a circuit-closing device therefor, and means for exerting upon said circuit-closing device the resultant of two opposing forces one of which is a function of the energy to be measured and the other out of proportion to the speed of the motor.

10. In an electric-current meter, the combination of a motor arranged to run at different speeds during normal operation, means for supplying energy to the motor, and means for withdrawing the supply of energy when the torque of the motor is approximately proportional to the square of the current to be measured.

In witness whereof I have hereunto set my hand this 7th day of October, 1898.

ELIHU THOMSON.

Witnesses:
DUGALD McKILLOP,
HENRY O. WESTENDARP.